United States Patent
Carmona Ballester et al.

(10) Patent No.: US 12,287,243 B2
(45) Date of Patent: Apr. 29, 2025

(54) METHOD AND OPTICAL SYSTEM FOR CHARACTERIZING DISPLAYS

(71) Applicant: WOOPTIX S.L., Madrid (ES)

(72) Inventors: David Carmona Ballester, Santa Cruz de Tenerife (ES); Juan Manuel Trujillo Sevilla, Santa Cruz de Tenerife (ES); Sergio Bonaque Gonzalez, Santa Cruz de Tenerife (ES); Jose Manuel Rodriguez Ramos, San Cristóbal de la Laguna (ES)

(73) Assignee: WOOPTIX S.L., Madrid (ES)

( * ) Notice: Subject to any disclaimer, the term of this patent is extended or adjusted under 35 U.S.C. 154(b) by 242 days.

(21) Appl. No.: 17/594,945

(22) PCT Filed: Apr. 29, 2020

(86) PCT No.: PCT/EP2020/061899
§ 371 (c)(1),
(2) Date: Nov. 3, 2021

(87) PCT Pub. No.: WO2020/225053
PCT Pub. Date: Nov. 12, 2020

(65) Prior Publication Data
US 2023/0152162 A1  May 18, 2023

(30) Foreign Application Priority Data
May 7, 2019 (EP) .................. 19382346

(51) Int. Cl.
G01J 9/00 (2006.01)
G01J 1/42 (2006.01)
H04N 23/957 (2023.01)

(52) U.S. Cl.
CPC . *G01J 9/00* (2013.01); *G01J 1/42* (2013.01); *H04N 23/957* (2023.01); *G01J 2009/002* (2013.01)

(58) Field of Classification Search
CPC .......... G01J 1/42; G01J 2009/002; G01J 9/00; G02B 26/06; G02F 1/1309;
(Continued)

(56) References Cited

U.S. PATENT DOCUMENTS 9,513,541 B2    12/2016   Vermeirsch et al.
10,937,129 B1 *  3/2021   Fix .......................... G06V 40/19
(Continued)

FOREIGN PATENT DOCUMENTS

JP    3180075 U      12/2012
JP    2013539078 A   10/2013

OTHER PUBLICATIONS

Agour, Mostafa, Claas Falldorf, and Ralf B. Bergmann. "Holographic display system for dynamic synthesis of 3D light fields with increased space bandwidth product." Optics express 24.13 (2016): 14393-14405.*

(Continued)

*Primary Examiner* — Mohammed S Rahaman
(74) *Attorney, Agent, or Firm* — McCoy Russell LLP

(57) ABSTRACT

The disclosure relates to a method for characterizing and operating a display, such as a light-field display or a display with or without a phase screen, comprising: an input stage wherein at least one test signal is provided as input to the display, a capture stage for obtaining display output information, said capture stage comprising capturing, by at least one acquisition system placed at a distance from the display, an impulse response of the display in response to the at least one provided test signal, wherein said capturing of an impulse response comprises measuring the at the at least one
(Continued)

acquisition system received intensity distribution of the light emitted by the display in response to the at least one test signal, and/or capturing the wavefront phase of the light emitted by the display in response to the at least one test signal.

18 Claims, 3 Drawing Sheets

(58) Field of Classification Search
CPC ....... G09G 2320/0693; G09G 2320/08; G09G 2360/147; G09G 3/006; H04N 23/957
See application file for complete search history.

(56) References Cited

U.S. PATENT DOCUMENTS

| | | | | |
|---|---|---|---|---|
| 2005/0259064 | A1* | 11/2005 | Sugino | G09G 3/342 345/102 |
| 2010/0118007 | A1* | 5/2010 | Hori | G09G 3/3614 345/207 |
| 2012/0008181 | A1* | 1/2012 | Cable | G03H 1/2294 359/9 |
| 2012/0127320 | A1 | 5/2012 | Balogh | |
| 2017/0122725 | A1* | 5/2017 | Yeoh | H04N 13/144 |
| 2019/0391020 | A1* | 12/2019 | Levecq | G01J 9/0215 |

OTHER PUBLICATIONS

ISA European Patent Office, International Search Report Issued in Application No. PCT/EP2020/061899, Jul. 24, 2020, WIPO, 2 pages.
Japanese Patent Office, Office Action Issued in Application No. 2021-565997, Jan. 24, 2023, 8 pages.

* cited by examiner

METHOD AND OPTICAL SYSTEM FOR CHARACTERIZING DISPLAYS

CROSS REFERENCE TO RELATED APPLICATIONS

The present application is a U.S. National Phase of International Application No. PCT/EP2020/061899 entitled "METHOD AND OPTICAL SYSTEM FOR CHARACTERIZING DISPLAYS," and filed on Apr. 29, 2020. International Application No. PCT/EP2020/061899 claims priority to European Patent Application No. 19382346.5 filed on May 7, 2019. The entire contents of each of the above-listed applications are hereby incorporated by reference for all purposes.

TECHNICAL FIELD

The disclosure relates to a method, a storage media, and a computer system, for characterizing and operating a display.

BACKGROUND AND SUMMARY

Current traditional display technology is in general based on the emission of an electromagnetic field by means of lighting or illuminating a particular structure of units called pixel(s), that are arranged in a predetermined manner.

A structure of pixels of display can be formed in different ways, for example, but not limited to, layers of molecules in a liquid crystal displays (LCDs), which act as an attenuator for a light source that is normally, for example, located at the back of the display; or light emitting diodes (LEDs), comprising among others, for example, organic light emitting diodes (OLEDs), e.g. passive-matrix organic light emitting diodes (PMOLEDs) or active-matrix organic light emitting diodes (AMOLEDs), wherein every pixel is a LED emitting a certain amount of light according to an electrical signal.

In general, any light attenuating material, which may include a blocking discrete or continuous pattern, can be considered an effective display when a light emitting material or device is located as a light source on its rear or its back.

When an electromagnetic wave passes through an inhomogeneous medium, e.g. the light attenuating material of a display and/or the medium between an observer and the display, its wavefront phase gets distorted or deformed with respect to its original shape or phase. Said wavefront distortions or aberrations can affect and degrade the performance of optical systems, such as the quality and performance of electronic displays.

Moreover, any present defects, irregularities, surface deformations and/or pixel malfunctions of an electronic display may result in wavefront distortions or wavefront phase changes that can significantly degrade the performance of the display.

Aside from the above-mentioned traditional displays, the problem of wavefront distortions or aberrations leading to degradation of quality and performance of an optical display systems also affects other type of displays, such as for example, so-called light-field displays (LFDs), head-mounted displays (HMDs) and/or light-field head-mounted displays (LF-HMDs).

Light-field displays are a type of display comprising a traditional display followed by a wave-guide, e.g. a micro-lens-array (MLA) or pinhole array, or any mask that may act as a guide for a light ray emitted by a display pixel.

Light-field displays can provide automultiscopy, and can grant observers full parallax within the field of view of the display.

HMDs are displays designed to be used as head-gear and comprising a display optic in front of one or both eyes and may inter alia be used for applications in virtual reality (VR), augmented reality (AR) or mixed reality (MR).

The term light-field head-mounted displays (LF-HMDs) can inter alia refer to HMDs that further comprise a wave-guide, e.g. a microlens-array or pinhole array or mask, similar to light-field displays.

HMDs and LF-HMDs may also allow for an automultiscopy viewing experience within their field of view.

Said wave-guides, e.g. a microlens-array (MLA) or pinhole array, or any mask that may act as a guide for a light ray emitted by a display pixel, can act as a phase screen/additional phase screens that can impart further wavefront phase changes to wavefronts emitted by the display/by a display pixel.

To measure and possibly correct said aberrations or wavefront distortions or wavefront phase changes of wavefronts emitted by a display, e.g. a display according to any of the above-mentioned types, and to better understand the characteristics, including surface deformations and/or pixel malfunctions, and/or the metrology of a/the display and to optimize the operations of a/the display is technically challenging and may inter alia require intricate optical sensors and/or computationally complex algorithms.

PROBLEM

It is therefore the object of the present disclosure to provide improved means for the metrology and for the optimization of operations of electronic displays, e.g. any type of displays identified above.

For example, it is an aim of the present disclosure to provide improved means for measuring the characteristics and evolution of the wavefronts emitted by the display, such as to measure and monitor wavefront distortions, e.g. wavefront phase distortions.

Furthermore, it is an aim of the present disclosure is to simplify and to speed up the measurement and analysis of temporal wavefront changes or temporal phase changes of wavefronts emitted by an electronic display.

SOLUTION

According to the present disclosure, an example method for characterizing and operating a display is provided, such as a light-field display or a display with or without a phase screen.

For example, a method for characterizing and operating a display, such as a light-field display or a display with a phase screen or with a plurality of a phase screens or without a phase screen, may comprise, one, some or all of the following steps.

an input stage wherein at least one test signal is provided as input to the display, wherein the test signal can, for example, be a single transient signal impulse or a series of signal impulses, i.e. the input provided to the display can be understood as an input in the form of a signal impulse, a capture stage for obtaining display output information wherein said capture stage can comprise: capturing, by at least one acquisition system placed at a distance from the display, an impulse response of the display in response to the at least one provided test signal, wherein said capturing of an impulse response comprises measuring the at the at least one acquisition system received intensity distribution of the light emitted by the display in response to the at least one test signal, and/or wherein said capture stage can comprise: capturing by the least one acquisition system or by a further additional acquisition system the wave-front phase of the light emitted by the display in response to the at least one test signal.

The above and herein described exemplary method for characterizing and operating a display, inter alia allows to improve the characterization of a display, of any of the above-described types, for instance, in the presence of arbitrary phase screens and in the presence of irregularities in the physical structure and/or the function of the display.

BRIEF DESCRIPTION OF THE FIGURES

The following figure illustrate exemplary.

DETAILED DESCRIPTION

Figure 1:
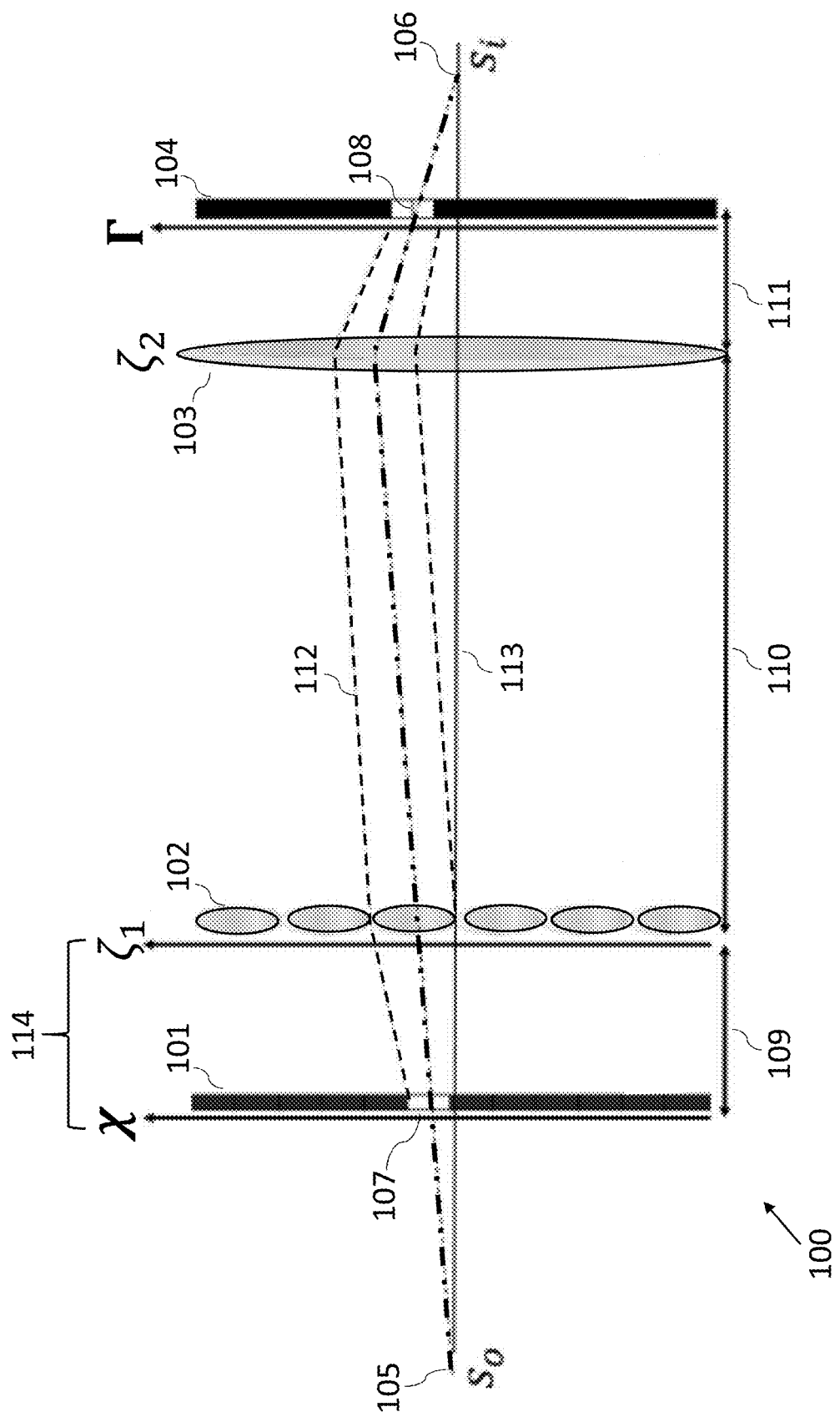
FIG. 1: First exemplary basic optical setup

For completeness, it is noted, that in addition to any of the above-described types of displays, e.g. LCDs, LEDs, LFDs, HMDs, LF-HMDs, the above and herein described exemplary method and means characterizing and operating a display, can inter alia also be applied to cathode ray tube displays (CRTs), electroluminescent displays (ELDs), electronic paper or plasma display panels (PDPs).

Herein the step of characterizing a display can inter alia be understood as providing a metrology of the display, such as of the structure, e.g. surface structure and/or pixel structure, of the display, as well as providing characteristics of the display, such as for example, brightness, luminance, contrast, resolution, pixel pitch, phase-screen topography, pixel malfunctions.

Furthermore, the step of operating a display, can inter alia be understood as operating the display based on the derived or determined metrology, i.e. the derived or determined characteristics of the display. For example, during operation of the display an input signal to be outputted by the display, may be modified on the basis of a determined display characteristic or display metrology, e.g. a specific pixel and/or a specific set of pixels of a display may be provided with a specific input signal to compensate for some defects or malfunctions of said specific pixel or said specific set of pixels, e.g. a specific pixel and/or a specific set of pixels may be set to specific brightness intensity values.

The above and herein described exemplary method for characterizing and operating a display can inter alia provide means to characterize a display when an arbitrary phase screen and irregularities are present, for example a secondary liquid crystal (LC) layer or a microlens array (MLA) arranged on the back or the rear of a regular display, and wherein a backlight in the case of an LCD is present in one of the sides of the structure. Such characterization may be used to achieve a better use of the bandwidth of said display.

For instance, the above and herein described exemplary method for characterizing and operating a display can provide an improved characterization of the spatial structures that define the display.

For example, the pixels that form the display screen already may have a particular shape that might not fit the commonly used square RGB (Red-Green-Blue) structure, and the measurement or characterization of said particular shape might be used to represent certain elements from an image to be displayed in a better, e.g. more accurate, way.

Furthermore, any optical element or manufacturing step that is implicit in the manufacturing process of the display might alter the structure of the display, thus generating different artifacts. These artifacts might interfere with surrounding pixels in such a way that it might change the effective bandwidth of such display area. Thus taking this information into account can lead to a better optimized use of the bandwidth of the display, thereby improving the operation of the display.

Further exemplary display properties that can be characterized and measured by the above and herein described capturing of an impulse response of the display and/or capturing of a wavefront phase by an acquisition system may comprise display backlight and/or color for display calibration and/or color correction.

A further display property or characteristic that can be measured/characterized by the above and herein described capturing of an impulse response of the display and/or capturing of a wavefront phase by an acquisition system is the interdependency between adjacent or neighboring pixels. For example, when a pixel is turned on, this might affect its neighbors, thus instead of for example, having a signal of pixel values like 0-1-0 for three pixels with the middle one turned on, one might find in practice something like 0.1-1-0.1, i.e. a signal applied to a pixel may leak/crosstalk to its neighboring pixels.

Characterizing/measuring this effect can be used to compensate/correct for such undesired display behavior by, for example, by modifying the driver used to control/operate the display.

Furthermore, using the above and herein described methods and means any misalignments in different layers of a/the display that may have occurred during the stacking of different display layers during manufacturing, for example, during stacking of microlens arrays (MLAs) on top a display screen, e.g. LCD, for a light-field display (LFD) can be measured or characterized by their impact on the captured impulse response and or measured wavefront phase, so that this information can be used to accordingly control the driver for operating the display.

The step of providing the at least one test signal may inter alia comprises setting one or more pixel of the display to a predetermined value, e.g. a brightness intensity value and/or a color value, within the dynamic range of the display and/or within the color system of the display and for a predetermined duration of time. For example, when providing the at least one test signal, one or more pixel of the display may be set to its maximum brightness intensity value.

For example, therein a series of test signals can be applied/provided to the display, wherein each test signal of said series may comprise setting only one pixel or a group of pixels of the display to a predetermined value, e.g. a brightness intensity value and/or color value, and wherein the pixels between different test signals differ from each other and/or have some overlap.

Herein a test signal may inter alia be understood as comprising a series of signals or series of signal impulses applied to the display.

In other words a test signal that can be applied/provided to the display can be understood as a series of signals, wherein one pixel or a group of pixels of the display is set to a predetermined value, e.g. a brightness intensity value, and wherein the pixels between different signals differ from each other and/or have some overlap.

In said exemplary test signal or exemplary series of signal, a predetermined time interval or time gap between consecutive signals, e.g. between setting a pixel or a group of pixels, e.g. a group of 4×4 pixel, of the display to a predetermined value, can be chosen such as to avoid undesired interference between consecutive signals and to obtain a sufficiently clean and accurate impulse response. For example, said predetermined time interval or time gap between consecutive signals/consecutive test signals may depend on the settling time of the display pixel after having been turned on and/or may depend the refresh rate of the display (e.g. 0.017 ms for a 60 fps display) and/or may depend on the speed, e.g. shutter speed or exposure time, of the acquisition system.

In practice and from experimentation it has been found that said predetermined time interval or time gap between consecutive signals/consecutive test signals may be at least 0.05 ms, and for example, may lie between 0.05 ms and 0.2 ms.

However, when, for example, a/the defocus of the optical system is increased in order to correct for visual aberration, said exemplary times may increase.

To improve the resolution and accuracy of the characterization of the display, for example, an iteration/series of test signals/series of signals can be applied to the display, wherein for each signal/each test signal only one pixel of the display is set to a predetermined value, e.g. a brightness intensity value, until every pixel of the display has been subjected to a test signal/signal, i.e. until all of the display is scanned by the test signal.

In the exemplary capture stage for obtaining display output information, an exemplary acquisition system then may capture for each at least one signal/for each at least one test signal/for each at least one test signal impulse an impulse response in the form of image measuring the at the at least one acquisition system received intensity distribution of the light emitted by the display in response to each signal/each test signal/each test signal impulse, i.e. an intensity image of the impulse response, and/or an/the exemplary acquisition system may capture for each at least one signal/for each at least one test signal/for each at least one test signal impulse an impulse response in the form of a phase image capturing the wavefront phase of the light emitted by the display in response to the at least one test signal, i.e. a phase image.

The exemplary at least one acquisition system for capturing an impulse response of the display in response to the at least one provided test signal, wherein said capturing of an impulse response may comprise measuring the at the at least one acquisition system received intensity distribution of the light emitted by the display in response to the at least one test signal, and/or may comprise capturing the wave-front phase of the light emitted by the display in response to the at least one test signal, may comprise at least one camera, e.g. a camera for capturing light intensity of incoming light and/or a light-field camera or a plenoptic camera for capturing both the intensity and direction of incoming light, and/or may comprise at least one wave-front sensor, e.g. an indirect wave-front sensor and/or at least one direct wave-front sensor, e.g. a Shack-Hartmann sensor.

The exemplary above-mentioned intensity images and/or the phase image can be captured in a digital format by an acquisition system may and in order to save storage space may be cropped, such as to keeping only an image part/image region that corresponds to display region/display pixel(s) that were subjected to a test signal/signal.

Furthermore, a display or display image can be characterized based on the obtained display output information, wherein, for example, said characterization may comprise characterizing the display based on a linear system of equations based on a weighted sum of the intensity distribution of the light emitted by the display in response to the at least test signal and measured by the at least one acquisition system.

In other words, the impulse response captured by the at least one acquisition system in response to at least one test signal provided to the display, can be a captured or measured intensity distribution of the light emitted by the display in response to the at least test signal.

That is the exemplary obtained display output information captured by the at least one acquisition system in response to at least one test signal provided to the display, may, for example, comprise capturing at least one image by the acquisition system, wherein the image can be stored in a digital format for further analysis and further processing.

Said exemplary image that can be captured by the at least one acquisition system in response to at least one test signal provided to the display, may be referred to as display image.

For example, an analysis of the obtained display output information or display image, i.e. a captured impulse response, may comprise defining at least three two-dimensional coordinate systems or optical planes, e.g. three orthogonal two-dimensional coordinate systems, located at three different spatial positions, e.g. three different optical path distances $z_0$, $z_1$, and $z_2$, e.g. a coordinate system $\chi$ for the display located at spatial position $z_0$, a coordinate system $\zeta$ for a/the phase screen located at spatial position $z_1$ and a coordinate system $\Gamma$ for the acquisition system located at spatial position $z_2$. For completeness, it is noted that the reference signs $\chi$, $\zeta$, $\Gamma$ may also refer to normal vectors representing said exemplary two-dimensional coordinate systems or optical planes, e.g. a display plane ($\chi$), a phase screen plane ($\zeta$) and an acquisition system plane ($\Gamma$).

For example, and for convenience, $z_0$ can bet set to zero, such that $\overline{z_0 z_1} = z_1$, can be interpreted as a/the distance between the display, e.g. plane/coordinate system $\chi$, and a/the phase screen, e.g. plane/coordinate system $\zeta$, and the position $z_2$ can be interpreted as a/the distance between the display, e.g. plane/coordinate system $\chi$, and a/the acquisition system, e.g. plane/coordinate system $\Gamma$.

Furthermore, the above-identified exemplary planes/two-dimensional coordinate systems $\chi$, $\zeta$, $\Gamma$ can be arranged parallel or not parallel to each other in space, i.e. can have different spatial orientations to each other. In other words, the display and/or phase screen and/or acquisition system can be arranged parallel or with an angle, i.e. tilted, to each other.

An impulse response, IR, of the display in response to the at least one provided test signal, measured or captured by the at least one acquisition system can then, for example, be defined by the following (vector) equation $$I(\Gamma) = I(m(\chi, \zeta, z_1) z_2 + \zeta)$$

wherein I($\Gamma$) is the light intensity generated/received on/at the at least one acquisition system, e.g. on/at a sensor of the at least one acquisition system, e.g. image sensor, after the light emitted by the display in response to the test signal is propagated by means of a geometric propagation of the light to the plane of at least one acquisition system, and wherein the parameter m($\chi$, $\zeta$, $z_1$) indicates the slope of each light ray with respect to the coordinates within the optical planes $\chi$ and $\zeta$, and the distance $z_1$ between both. Stated differently $m(\chi, \zeta, z_1)$ can be seen as describing the slope of a light ray emitted from a point in $\chi$ to a point in $\zeta$, relative to the distance between the $\chi$ and $\zeta$ planes.

It is for completeness noted, that herein the propagation of wavefronts, i.e. electromagnetic wavefronts, or photons is assumed to follow the laws of geometrical optics, i.e. it is, for example, assumed that the direction of propagation is perpendicular to the wavefront. It is further noted, that the wavefront can be defined by the set of points of a wave having the same phase, i.e. the wavefront or wavefront shape can be described by a phase map, e.g. a two-dimensional phase map.

To improve analysis and further processing, e.g. improving the signal-to-noise ratio, a bias image from the display can be obtained, for which the brightness/intensity of every pixel of the display is set to zero. This bias can then, for example, be subtracted from the Impulse response, IR, captured/measured by the acquisition system.

Alternatively or in addition, also a bias or a dark image from the at least one acquisition system itself can be taken and can be subtracted from an/the image taken by the acquisition system of the captured impulse response of the display in response to a/the test signal provides as input to the display to further improve the signal-to-noise ratio by compensating for variations of sensitivity of the acquisition system, e.g. hot or cold pixels in a sensor, e.g. charge-coupled device sensor (CCD), of the acquisition system.

Exemplary, let P be the resolution of the at least one acquisition system, e.g. the resolution in pixels of a charge-coupled device sensor (CCD) of the acquisition system, and let R be a matrix, wherein each column contains the vectorized response of a display pixel captured in an image by the acquisition system, i.e. R can be understood as a matrix, wherein each column represents a captured impulse response $IR_n$ (with n being a display pixel index or test signal index) in the form of an image captured by an/the acquisition system, said image representing an intensity distribution of light emitted by the display/by the display pixel in response to a test signal, and let the vector $\rho$ be the to be determined intensity values or weights or coefficients of each of the pixels of the display, i.e. an/the intensity distribution of the display, such that the display represents an image to be displayed in the most accurate way.

Herein, the term vectorized can inter alia be understood as unwrapping an array or image so that the array or image can be represented by vector for use in a programming language.

Then a linear system of n equations, with display pixel index (or test signal index) n=1 to N, with N being a natural number representing the physical resolution of the display, for an to be observed image I of the display (or image displayed by the display), can be defined for every display pixel n by a summation over the direct product of R and $\rho$, i.e. by $$I_p = \sum_{p=1}^{P} R_{p,n} \cdot \rho_n,$$

and wherein $I_p$ can be understood as the intensity or intensity distribution received/captured by an acquisition system of the light emitted by the display, i.e. a display pixel or a group of display pixels, in response to a test signal, wherein the acquisition system has a resolution of P, with acquisition system pixel index p=1 to P, and wherein $\rho_n$ are the intensity values each of the pixels on the physical display will have in order to represent $I_p$ in the most accurate/most truthful way.

For completeness, it is noted that the image $I_p$ can be generated/adjusted such as to fit the resolution of the acquisition system or the display.

In other words $I_p$ can be understood as the intensity values of a known input/known image I (e.g. a known test signal/known test image) that an observer or acquisition system ideally should observe when viewing the display displaying the Image I and which herein is also referred to as objective image, i.e. $I_p$ can be understood as objective intensity values, i.e. the intensity values perceived by an observer or acquisition system when looking at the screen.

Herein, the terms $I_p$ or I can be referred to as intensity image(s).

Hence, the exemplary above expressed equation is an example for a linear system of equations based on a weighted sum of the intensity distribution of the light emitted by a display in response to a test signal/test image and measured by an acquisition system.

Solving said exemplary equation system for $\rho$, said $\rho$ then can inter alia be used as basis for characterizing and operating the display, since $\rho$ or $\rho_n$ comprises the intensity values each of the pixels on the physical display should have in order to represent I or $I_p$ in the most accurate way. Determining $\rho$ or $\rho_n$ allows determine the above-mentioned properties and characteristics of a display and allows to correct/compensate the/an image to be displayed for any possible errors, aberrations or artefacts introduced by the structure or properties of the display. The above given linear system of equations for the display can, for example, be solved by minimization, e.g. by a least-square minimization of the following Euclidean $l^2$ norm expression, wherein the indices of $I_p$, $R_{p,n}$, $\rho_n$ have been suppressed for clarity.

$$\min \|I - R\rho\|^2$$

The/a displayed image, I, that can be captured by the acquisition system and the therefrom determined $\rho$ or $\rho_n$, i.e. intensity values or weights or coefficients of each of the pixels of the display, i.e. an/the intensity distributions of the display, can serve as a basis to characterize the properties and characteristics of the display and can, for example, be compared to desired reference properties, reference structures and reference characteristics of the display.

In addition or alternatively a display or display image can be characterized based on the obtained display output information, wherein, for example, said characterization may comprise characterizing the display based on a linear system of equations based on a weighted sum of the wavefront phase of the light emitted by the display in response to the at least one test signal and captured by the at least one acquisition system.

Herein a phase screen can inter alia be modeled by the complex expression $e^{-j\phi}$, wherein $\phi$ is the two-dimensional phase map for a given phase screen and j is the imaginary number.

When, for example, a wave front, i.e. an electromagnetic field U, passes through a phase screen, the resulting field or wave front will have the shape or form $U e^{-j\phi}$.

From a computational point of view a phase screen can be modeled by a matrix wherein the different matrix elements represent different phase change values. An at least partially transparent object can then be modeled as a set or stack of phase screens.

For example, it is possible to measure the contribution of each pixel (in any possible combination) of a/the phase screen to the wavefront phase of the emitted electromagnetic field at an arbitrary distance from the display, i.e. display plane $\chi$, including a distance of zero.

Therein, the emitted electromagnetic field $U_s$ emitted by the display or display screen can be expressed, with exp [ ] being the natural exponent function as:

$$U_s(\chi)=A_s(\chi)\exp[j\phi(\chi)]$$

wherein j is the imaginary number, k is the wavenumber, $\lambda$ is the wavelength, $\phi$ is the phase, and s, $\chi$ refer to the display plane, wherein $\chi$ refers to the coordinate system used in the display plane s.

This emission is dependent on the values of intensity that each display pixel is given, i.e. it is dependent on the test signal provided as input to the display.

If, for example, the wavefront emitted by the display is then propagated to a phase screen at a distance $z_1$, said propagation is dependent on the diffraction regime and can, for example, be carried according to one of the following diffraction laws:

Fresnel Diffraction Approximation $$U_1(\zeta) = U_s(\chi)\exp(jkz_1)\exp\left(\frac{jk\zeta^2}{2}\right)$$

Fraunhofer Diffraction Approximation $$U_1(\zeta) = \frac{\exp(jkz_1)}{j\lambda z_1}\exp\left(j\frac{k}{2z_1}\zeta^2\right)\int\int_{-\infty}^{\infty}U_s(\chi)\exp\left(-j\frac{k\zeta\chi}{z_1}\right)d\zeta d\chi = \Im\{U_s\}$$

Rayleigh-Sommerfeld Approximation $$U_1(\zeta)=U_s(\chi)\exp(jkz_1\sqrt{1-(\lambda\zeta)^2})$$

In addition, at position or distance $z_1$, i.e. at the phase screen, the phase contribution of a turbulent medium between the display and a/the phase screen can be included in the electromagnetic field $U_1(\zeta)$ at the phase screen as follows:

$$U'_1(\zeta)=U_1(\zeta)\exp(j\phi_{z_1})$$

The electromagnetic field of the display can then be further propagated to a distance $z_2$, i.e. to the acquisition system plane, following the above-identified diffraction laws and turbulent medium phase contribution approximation and with substituting $z=z_2-z_1$ so a/the electromagnetic field $U_2(\Gamma)$ at the acquisition system plane can be obtained, referring to a/the electromagnetic field $U_2(\Gamma)$ that can, for example, be obtained by wavefront phase sensor of the acquisition system at position or distance $z_2$.

For completeness, it is noted that in the expressions above and below the index 1 refers to a/the phase screen and the index 2 refers to the acquisition system plane.

It is further noted that the phase contribution of a/the phase screen to the electromagnetic field/the electromagnetic wavefront of the display can be considered/modeled as the contribution of any number of stacked phase screens and that when, for example, a propagation of the electromagnetic field/the electromagnetic wavefront of the display between layers of stacked phase screens is carried, the above-mentioned exemplary diffraction laws and exemplary turbulent medium phase contribution approximation can be applied.

Said exemplary possible wavefront sensor of the acquisition system can then capture wavefront phase images of the wavefronts emitted by the display and propagated through said exemplary phase screen(s) can be saved to a storage device and can serve as a basis to characterize the properties and characteristics of the display.

The wavefront phase information that can be captured by a possible wavefront sensor of the acquisition system can then, like the display image that can be captured by the acquisition system and which, as indicated above, comprises the intensity distribution of the light emitted by the display in response to the at least one test signal, be used to characterize the display.

For example, the wavefront phase information or electromagnetic field information captured by a wavefront sensor of the acquisition system at the acquisition system plane can be expressed as the following linear system of equations based on a weighted sum of the wavefront phase of the light emitted by the display in response to the at least one test signal:

$$U_\Gamma = \sum_n^N U_{2_n}(\Gamma) = \sum_n^N A_{2_n}(\Gamma)\exp[j\phi_{2_n}(\Gamma)],$$

wherein the magnitude of the field can be related to the intensity contribution $A_{2_n}(\Gamma)=\sqrt{I_n(\Gamma)}$, and n is the number of stimuli/number of test signals (or number of pixels/pixel units of the display) used to evaluate the phase at the sensor plane and the index 2 refers to the acquisition system plane. Said system can again be solved by minimization, e.g. least-square minimization of the following Euclidean $l^2$ norm expression $$\min\left\|U'_p(\Gamma) - \left\{\sum_n^N A_{2_n}(\Gamma)\exp[j\phi_{2_n}(\Gamma)]\right\}\rho\right\|^2,$$

wherein $U'_p(\Gamma)$ represents a backward or forward propagation of an/the electromagnetic field/wavefront phase emitted by the display and captured/measured by an acquisition system in the acquisition system plane.

Hence, the electromagnetic field/wavefront phase captured/measured by an acquisition system in the acquisition system plane can be propagated to other planes/other optical depths that, for example, can represent different observers/different observer positions.

Thereby, the captured/measured wavefront phase of the light emitted by the display in response to the at least one test signal may comprise computing the propagation of the light emitted by the display in response to the at least one test signal to at least one phase screen and/or to the at least one acquisition system and/or an arbitrary observer position according to at least one of the above-mentioned diffraction approximations: Fresnel diffraction approximation, Fraunhofer diffraction approximation, Rayleigh-Sommerfeld diffraction approximation.

As previously indicated, the by the acquisition system measured intensity distribution of the light emitted by the display in response to the at least test signal and/or the by the acquisition system captured wavefront phase of the light emitted by the display in response to the at least one test signal can be stored as image/s on a computer readable storage medium or storage device.

The captured/measured intensity distribution information of the light emitted by the display in response to the at least test signal and/or the by the acquisition system captured wavefront phase information of the light emitted by the display in response to the at least one test signal can, besides serving as a basis for the characterization of the display, be also used to improve the operation and performance of the display.

For example, the herein described method, may further comprise a display stage, wherein displaying an input signal to be outputted on the display can comprise displaying the input signal taking into account the captured display output information.

For example, if it has been determined from the information captured by the acquisition system that certain display pixel have a different response to the test signal, e.g. emit more or less light, i.e. are brighter or fainter as they should be according to the test signal, then, for example, the brightness of said pixel may be adjusted to compensate for the measured deviation.

Furthermore, the exemplary step of displaying an input signal to be outputted on the display and therein taking into account the captured display output information can comprise correcting visual aberrations that were detected/derived from the captured display output information.

Furthermore, for example, once the wave-front phase of the electromagnetic field emitted by the display is measured, the wave-front phase of an input signal to be outputted can be accurately be propagated to a predetermined optical plane based on the captured wave-front phase information.

The above and herein described exemplary steps for characterizing and operating a display, such as a light-field display or a display with or without a phase screen, can be stored as computer readable instructions on a computer-readable storage medium, so that a computer system reading said instructions from said medium is enables to carry out any of the above and herein described steps.

A computer system suitable for carrying out any of the above and herein described exemplary steps for characterizing and operating a display may comprise at least one processor unit, e.g. a graphical processor unit, GPU, or a central processing unit, CPU.

It is further conceivable that said exemplary computer system can comprise a field programmable gate array, FPGA, and/or a complex programmable logic devices, CPLD configured for carrying out or configured for aiding/supporting in carrying out computations for the above and herein described exemplary steps for characterizing and operating a display.

An exemplary optical system for characterizing and operating a display, such as a light-field display or a display with a phase screen or a plurality of phase screens or without a phase screen, may inter alia comprise at least one acquisition system, wherein the at least one acquisition system is placeable at a predetermined distance from the display.

Said at least one acquisition system can be configured for capturing an impulse response of the display in response at least one test signal applied to the display, and wherein said capturing of an impulse response can comprise measuring the at the at least one acquisition system received intensity distribution of the light emitted by the display in response to the applied at least one test signal.

In addition or alternatively, said at least one acquisition system can be configured for capturing the wavefront phase of the light emitted by the display in response to the at least one test signal applied to the display.

Said exemplary at least one acquisition system may comprise at least one camera, e.g. a camera for capturing light intensity of incoming light and/or a light-field camera or a plenoptic camera for capturing both the intensity and direction of incoming light.

In addition or alternatively, said at least one acquisition system can comprise at least one wave-front sensor, e.g. an indirect wave-front sensor and/or at least one direct wave-front sensor, e.g. a Shack-Hartmann sensor.

The herein exemplary described means for characterizing and operating a display, e.g. a light-field display or a display with a phase screen or a with a plurality of phase screens or without a phase screen or a display of any kind, can provide a plurality of benefits and improvements for the characterization/metrology and operation/operational performance of a display.

Said benefits and improvements may inter alia comprise:

Correction of imperfections on the display surface, e.g. sampled/captured information contained in a captured impulse response of the display in response to the at least one provided test signal, wherein said capturing of an impulse response comprises measuring the at the at least one acquisition system received intensity distribution of the light emitted by the display in response to the at least one test signal and/or contained in a captured wavefront phase of the light emitted by the display in response to the at least one test signal, can be used to remove or mitigate the effects of manufacturing issues or undesired artifacts present on the display surface.

This is due to assuming that a particular image is rendered directly into the retina of an observer.

As the exemplary acquisition system described herein can provide a measure of how the pixels of the display transfer to the acquisition system when, for example, assuming the same aberration as the eye, it can be stated that the image observed according to the herein presented method can be directly rendered into the retina of an observer.

Correcting Low and High-Order Aberrations when capturing of an impulse response comprises measuring the at the at least one acquisition system received intensity distribution of the light emitted by the display in response to the at least one test signal and solving the above indicated linear system of n equations for the impulse response $IR_n$, a solution for the system can be obtained when an implicit visual aberration is present. For an observer with a similar or equal aberration, this is can, for example, be represented as:

$$R'_n = (R_n \otimes PSF) \odot M$$

wherein $\otimes$ is the convolution operator and $\odot$ is the elementwise product, $R'_n$ is the convolved impulse response when the system, e.g. the observer/acquisition system is out of focus, and M is a mask function taking into account the spatial limits of the geometric propagation of the light rays through the phase-screen and PSF is the point spread function.

Solving said linear system of equations with this information yields a reconstruction at such optical power, accounting for the introduced aberrations.

When capturing the wavefront phase of the light emitted by the display in response to the at least one test signal, an estimation of the point spread function (PSF) of the observer can be made in terms of the phase induced by the optical system, i.e. an observer. This can be represented as a polynomial sum of coefficients, for example Zernike or Seidel. For an objective field, i.e. the electromagnetic field an observer ideally should perceive in the absence of any distortions or aberration, at the pupil of an optical system, a phase $\phi_{obs}$ is added to the objective electromagnetic field $U'_p(\Gamma)$.

Super-resolution can be achieved, i.e. an oversampled image can be formed at the retina of an observer if the measurements of the impulse response of the display in response to the at least one provided test signal, comprising measuring by the/an acquisition system the intensity distribution of the light emitted by the display in response to the at least one test signal, are carried with an acquisition system, e.g. a camera or similar, with higher resolution than the effective display area of the display.

Multi-depth autofocus can be achieved. For example, it is possible to consider a multi-depth refocusing if more than one parts of the/an image to be displayed are assigned to different depths. This can be represented by means of a depth map.

The method and means described herein, are not only capable of correcting low order aberrations such as defocus and astigmatism, but also higher order aberrations.

Autostereoscopy can be achieved: For example, if the original display is used as a light-field source, the information obtained from both techniques, the information obtained from capturing an impulse response comprises measuring the at the at least one acquisition system received intensity distribution of the light emitted by the display in response to the at least one test signal (intensity capture technique), and/or the information obtained from capturing the wavefront phase of the light emitted by the display in response to the at least one test signal (wavefront phase capture technique) can be used in order to switch between light-field display and a regular display.

Intensity capture technique: The above identified system of linear equation is solved for multiple captures (multiple measurements of intensity distributions of the light emitted by the display in response to the at least one test signal at different distances/positions from the display) related to the expected positions of the observers.

Wavefront phase capture technique: Here, only one measurement of the electromagnetic field or wavefront phase of the light emitted by the display in response to the at least one test signal is needed, since the measured electromagnetic field or wavefront/wavefront phase can then be propagated according to geometric optic laws either backwards or forwards to account for a light-field.

A Crosstalk Free Light-Field Display can be Obtained

The information obtained from the intensity capture technique and/or the wavefront phase capture technique can overcome the problem in light-field displays of observing an overlapping of two different views if the observer is located at a specific distance where the conditions of the Nyquist-Shannon sampling theorem are not fulfilled.

To prevent or minimize crosstalk, any signal can, for example, be sampled with at least twice its frequency in order to be represented with sufficient accuracy.

FIG. 1 exemplary shows a basic optical setup simplified to one dimension to illustrate some aspects of the disclosure.

Therein an exemplary display 101, e.g. a liquid crystal display (LCD), located in/at the exemplary optical plane/exemplary coordinate system $\chi$ is shown and which together with a (first) phase screen 102, e.g. an exemplary microlens array, located at a distance 109 in/at the exemplary optical plane/exemplary coordinate system $\zeta_1$, can form an exemplary light-field display 114 or integral display. The distance 109 thereby can, for example, correspond to a focal length of the phase screen 102, e.g. the focal length of a microlens array.

An exemplary light source 105 can be located at the back of the display 101 and can be used to apply an exemplary test signal or signal impulse to the display 101, 114, e.g. setting a pixel 107 to a predetermined brightness intensity.

An exemplary acquisition system 104 can be located in/at the exemplary optical plane/exemplary coordinate system $\Gamma$ and can be configured to capture an impulse response 106, IR, of the display 101 in response to the at least one provided test signal, wherein said capturing of an impulse response can comprise measuring the at the at least one acquisition system 104, e.g. at pixel or at region 108, received intensity distribution of the light emitted by the display 101 in response to the at least one test signal, and/or may comprise capturing the wavefront phase of the light emitted by the display 101 in response to the at least one test signal.

Optionally the exemplary acquisition system 104 may further comprise a phase screen 103, e.g. a phase screen, e.g. a lens, located at exemplary optical plane/exemplary coordinate system $\zeta_2$ arranged at a (focal) distance 111 from the acquisition system plane $\Gamma$ to focus light emitted by the display 101 in response to the at least one test signal onto a sensor of the acquisition system 104.

For completeness it is noted that the reference numeral 110 denotes the distance 110 along the exemplary optical axis 113 between the two exemplary phase screens 102 and 104 and that the reference numeral 112 denotes an exemplary optical ray path geometry, including a main ray and ancillary rays for the light emitted by the display 101 in response to the exemplary at least one test signal, wherein the exemplary pixel 107 of display 101, 114 is set to a predetermined brightness intensity value.

In the exemplary case of the phase screen 102 being an exemplary microlens array, the position $\Gamma_{IR}$ of the impulse response captured by the exemplary acquisition system in an exemplary sensor plane/acquisition system plane, can, for example, be expressed as:

$$\Gamma_{IR} = d\frac{s_i - f_l}{s_i}\left(\zeta_1 - \frac{\chi - \zeta_1}{f_m}\right),$$

wherein d refers to the exemplary distance 110 between the exemplary phase screens 102 and 103, $f_m$ refers to the exemplary distance (focal length) between the display and the (first) phase screen $\zeta_1$, and wherein $f_l$ refers to the exemplary distance (focal length) between the exemplary optional (second) phase screen $\zeta_2$ and the acquisition system.

In other words, said exemplary expression can describe the positional mapping from the test signal in the display plane to the captured impulse response in the acquisition system plane.

Figure 2:
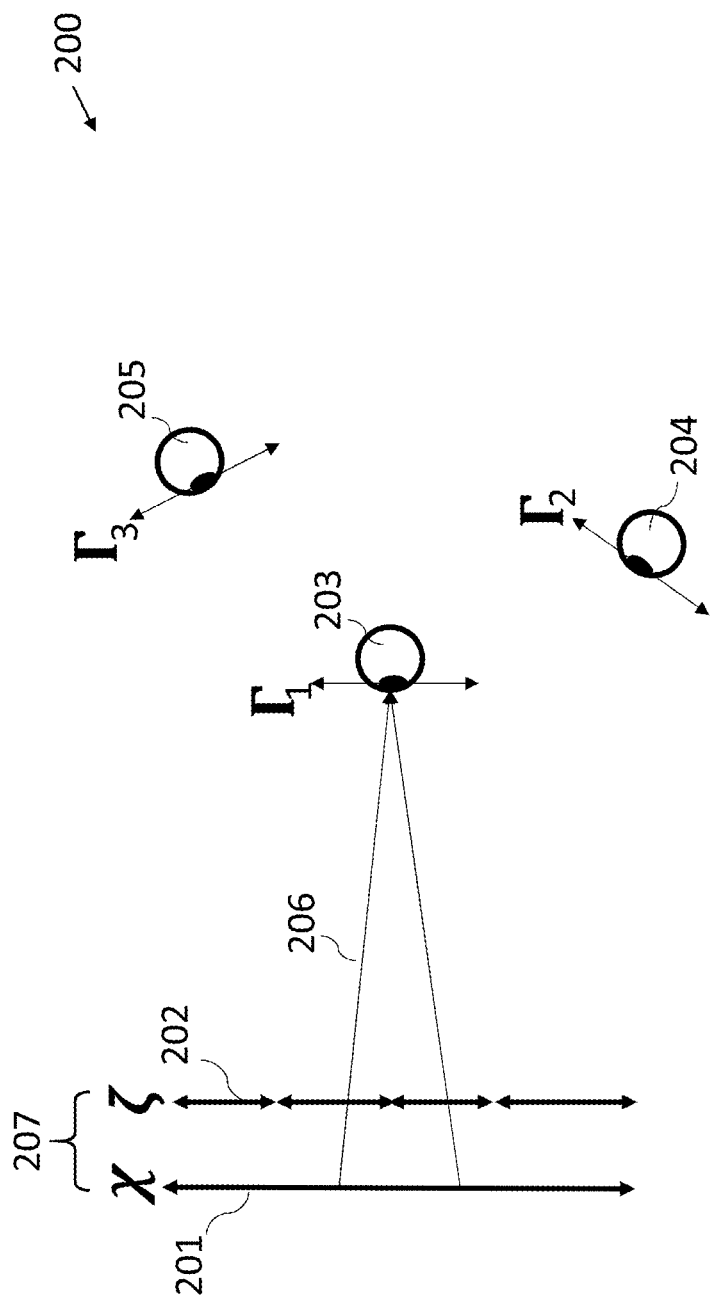
FIG. 2: Second exemplary basic optical setup

FIG. 2 exemplary shows an exemplary alternative optical system/setup 200, to illustrate a further aspect of the disclosure.

Herein an exemplary display 201 located in/at the exemplary optical plane/exemplary coordinate system $\chi$ is shown and which together with a phase screen 202, e.g. an exemplary microlens array, located in/at the exemplary optical plane/exemplary coordinate system $\zeta$, can form an exemplary light-field display 207 or integral display.

Assuming, for example, that an acquisition system (not shown) as described above and that is/was located at exemplary optical plane/exemplary position/exemplary coordinate system $\Gamma_1$, may have captured an impulse response of the display 201, 207 in response to at least one provided test signal, wherein said capturing of an impulse response comprises measuring the at the at least one acquisition system received intensity distribution of the light emitted by the display 201, 207 in response to the at least one test signal, and/or may have captured the wavefront phase of the light emitted by the display 201, 207 in response to the at least one test signal and assuming further that the display 201, 207 is characterized and operated as described above on the basis of the information captured by the acquisition system, only the exemplary observer 203 that is located at $\Gamma_1$, i.e. the location at which the acquisition system (not shown) was originally placed would see the/an image outputted by the display 201, 207 correctly.

However, since the exemplary acquisition system is also capable of capturing the wavefront phase of the light emitted by the display 201, 207 in response to the at least one test signal, said captured wavefront phase information can be used (as explained further above) to propagate the light/the electromagnetic field emitted by the display 201, 207 to any other observer location at different distances/locations/optical depths using any of the above indicated diffraction approximation laws, so that, for example, also observers 204, 205 at positions $\Gamma_2$, $\Gamma_3$ and with different orientations with respect to the display 201, 207 can see the correct/optimized image shown/outputted by the display 201, 207.

For completeness it is noted that the reference numeral 206 denotes an exemplary ray path geometry of light, e.g. an image output/image signal, emitted by the display 201, 207.

Figure 3:
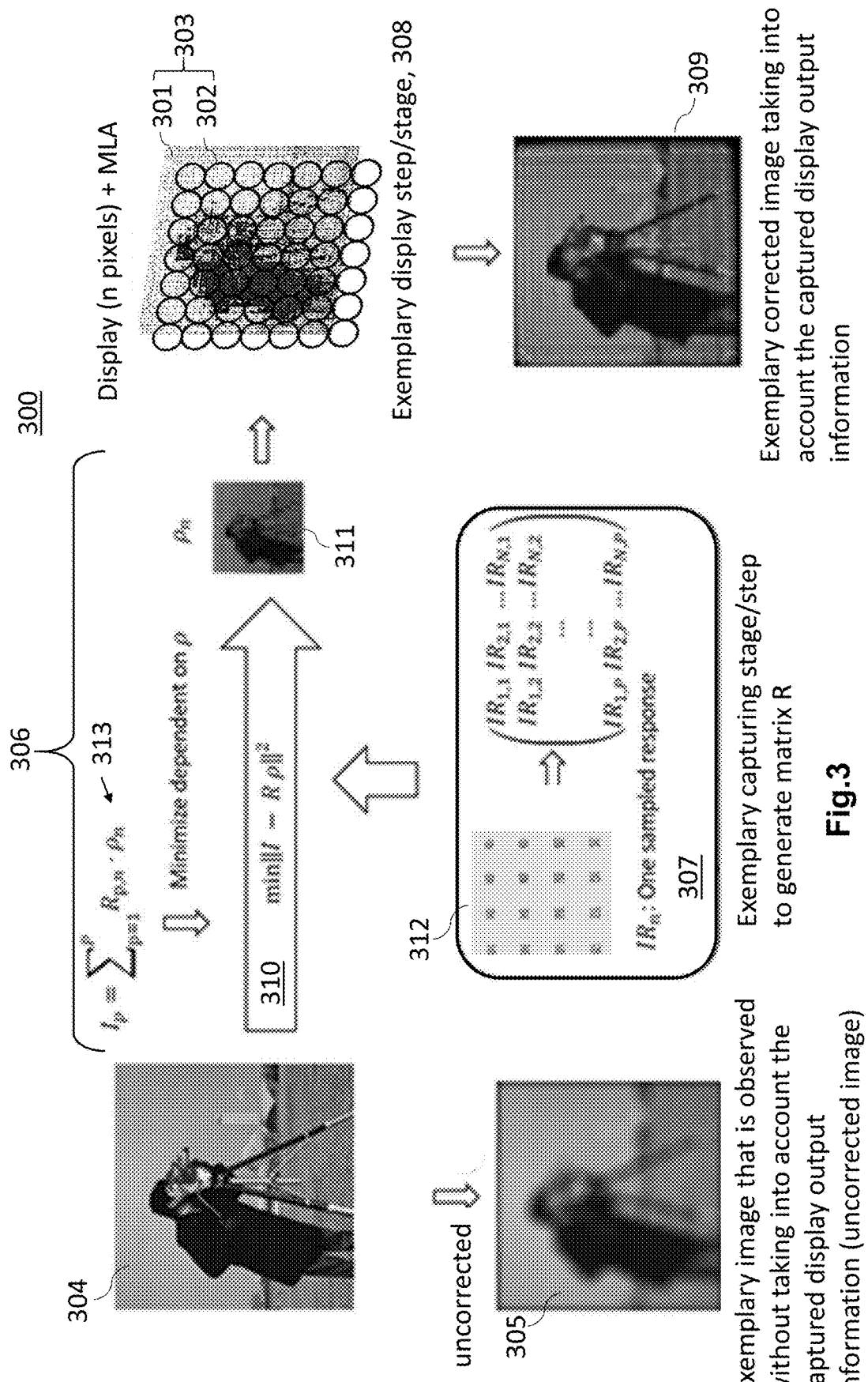
FIG. 3: Exemplary aspect of a method for characterizing and operating a display.

FIG. 3 exemplary illustrates a scheme 300 for some aspects of the herein described for characterizing and operating a display, showing an exemplary light-field display 303 formed by a (conventional) display and an exemplary microlens array (MLA).

Ideally an observer for example wants to see an accurate representation/display of an image I, i.e. an exemplary objective image, with $I_p$, describing the (true) intensity values the pixels in the acquisition system plane should have (in the absence of any distortions or aberrations due to surface deformations and/or display malfunctions and other irregularities).

However, due to the practically unavoidable imperfection of the display, the observer only sees/perceives a degraded (uncorrected), e.g. blurred, image 305.

By following the above described approach to obtain information on the characteristics and properties of the display which can be extracted from the captured response of the display when subjected to a test signal, this degraded image 305 however can be corrected and can be displayed 308 correctly as a corrected image 309 representing the (inputted) image 304 as accurately as possible.

In this schematic example, an example for capturing 306, by at least one acquisition system (not shown) placed at a distance from the display, an impulse response of the display 303 in response to a test signal 312 (for simplicity only a 4×4 pixels sample is depicted), is shown, wherein said capturing of an impulse response further comprises measuring the at the acquisition system received intensity distribution of the light emitted by the display 303 in response to the at least one test signal and wherein the exemplary steps comprise setting up a linear system 313 of equations based on a weighted sum of the intensity distribution of the light emitted by the display in response to the test signal and measured by the acquisition system.

Exemplary, let P be the resolution of the at least one acquisition system, e.g. the resolution in pixels of a charge-coupled device sensor (CCD) of the acquisition system, and let R be a matrix generated 312 during the capture step 306, wherein each column contains the vectorized response of a display pixel captured in an image by the acquisition system, i.e. R can be understood as a matrix, wherein each column represents a captured impulse response $IR_n$ (with n being a display pixel index or test signal index) in the form of an image captured by an acquisition system, said image representing an intensity distribution of light emitted by the display/by the display pixel in response to a test signal, and let the vector $\rho$ be the to be determined intensity values or weights or coefficients of each of the pixels of the display, i.e. the intensity distribution of the display, such that the display represents the image to be displayed in the most accurate way.

Then a linear system 313 of n equations, with display pixel index (or test signal index) n=1 to N, with N being a natural number representing the physical resolution of the display, for an to be observed image I of the display (or image displayed by the display), can be defined for every display pixel n by a summation over the direct product of R and $\rho$, i.e. by $$I_p = \sum_{p=1}^{P} R_{p,n} \cdot \rho_n,$$

and wherein $I_p$ can be understood as the intensity or intensity distribution received/captured by an acquisition system of the light emitted by the display, i.e. a display pixel or a group of display pixels, in response to a test signal, wherein the acquisition system has a resolution of P, with acquisition system pixel index p=1 to P, and wherein $\rho_n$ are the intensity values each of the pixels on the physical display will have in order to represent $I_p$ in the most accurate/most truthful way.

As described further above, solving said exemplary equation system for $\rho$ (311), said $\rho$ then can inter alia be used as basis for characterizing and operating the display, since $\rho$ or $\rho_n$ comprises the intensity values each of the pixels on the physical display should have in order to represent image I (304) or $I_p$ in the most accurate way.

Determining $\rho$ or $\rho_n$ allows determine the above-mentioned properties and characteristics of the display 303 and allows to correct/compensate the image 304 to be displayed for any possible errors or artefacts introduced by the structure or properties of the display 303. The above given linear system of equations for the display can, for example, be solved by minimization 310, e.g. by a least-square minimization of the following Euclidean $l^2$ norm expression, wherein the indices of $I_p$, $R_{p,n}$, $\rho_n$ have been suppressed for clarity.

$$\min\|I - R\rho\|^2$$

The displayed image 304, I, that can be captured by the acquisition system and the therefrom determined $\rho$ or $\rho_n$, i.e. intensity values or weights or coefficients of each of the pixels of the display, i.e. an/the intensity distributions of the display, can then serve as a basis to characterize the properties and characteristics of the display and can, for example, be compared to desired reference properties, reference structures and reference characteristics of the display.

With the exemplary obtained display output/characteristics information based on the determined $\rho$ it is then, for example, possible to control/modify a driver that operates the display 303 to correct the output of the display such that a corrected image 309 is displayed 308 that most accurately represents the (true) image 304 that a user/observer/acquisition system wants to see.

Followed by three sheets comprising FIG. 1, FIG. 2 and FIG. 3 and wherein the reference numerals identify the following components:

100 exemplary optical system/setup
101 exemplary display, e.g. LCD, exemplary display without a phase screen
102 exemplary (first) phase screen, exemplary microlens array (MLA)
103 exemplary (second) phase screen, exemplary lens
104 exemplary acquisition system, exemplary sensor of acquisition system, e.g. CCD image sensor and/or wavefront phase sensor
105 exemplary light source, exemplary test signal, exemplary impulse
106 exemplary measured/captured impulse response, exemplary location/region/pixel receiving the light emitted by the display in response to the applied test signal
107 exemplary pixel/group of pixel of display to which an exemplary signal/test signal/impulse is applied
108 exemplary pixel/group of pixel/region of acquisition system receiving the light emitted by the display in response to the applied test signal
109 exemplary distance between display and (first) phase screen
110 exemplary distance between exemplary phase screens
111 exemplary distance between (second) phase screen and exemplary acquisition system
112 exemplary optical ray path geometry, including a main ray and ancillary rays
113 exemplary optical axis
114 exemplary display with phase screen, exemplary light-field display, exemplary integral display, formed by display 101 and phase screen 102
200 exemplary alternative optical system/setup
201 exemplary display
202 exemplary phase screen, e.g. microlens array MLA
203 exemplary (first) observer at first position
204 exemplary (second) observer at second position
205 exemplary (third) observer at third position
206 exemplary ray path geometry of light emitted by display/exemplary display output
207 exemplary display with phase screen, exemplary light-field display, exemplary integral display, formed by display 201 and phase screen 102
300 exemplary scheme for characterizing and operating a display
301 exemplary display, e.g. display with
302 exemplary microlens array (MLA)
303 exemplary light-field display formed by display and microlens array
304 exemplary image, I or $I_p$, exemplary objective image, an observer wants to see displayed
305 exemplary image the observer actually sees, when no corrections are applied
306 exemplary stage/step of capturing an impulse response from display
307 exemplary generation of impulse response matrix R
308 exemplary display stage
309 exemplary displayed/perceived corrected image
310 exemplary minimization
311 exemplary determined vector $\rho$ or $\rho_n$, the to be determined intensity values or weights or coefficients of each of the pixels of the display, i.e. exemplary intensity distribution of the display, i.e. comprising the intensity values each of the pixels on the physical display should have in order to represent I or $I_p$ in the most accurate way
312 exemplary test signal
313 exemplary linear system of equations based on a weighted sum of the intensity distribution of the light emitted by the display in response to the at least test signal and measured by the at least one acquisition system

The invention claimed is:

1. A method for characterizing and operating a display, comprising:
an input stage wherein at least one test signal is provided as input to the display, wherein said test signal comprises a series of signals with a predetermined time interval of at least 0.05 ms between consecutive signals, and
a capture stage for obtaining display output information, said capture stage comprising:
capturing, by at least one acquisition system placed at a distance from the display, an impulse response of the display in response to the at least one provided test signal, wherein said capturing of an impulse response comprises capturing a wavefront phase of the light emitted by the display in response to the at least one test signal, wherein the at least one acquisition system comprises a direct wave-front sensor, and wherein the direct wave-front sensor is a Shack-Hartmann sensor.

2. The method according to claim 1, wherein providing the at least one test signal comprises setting one or more pixel of the display to a predetermined brightness intensity value within a dynamic range of the display.

3. The method according to claim 1, wherein a display image is characterized based on the obtained display output information, wherein said characterization comprises:
characterizing the display based on a linear system of equations based on a weighted sum of the intensity distribution of the light emitted by the display in response to the at least one test signal and measured by the at least one acquisition system, and/or
characterizing the display based on a linear system of equations based on a weighted sum of the wavefront phase of the light emitted by the display in response to the at least one test signal and captured by the at least one acquisition system.

4. The method according to claim 1, wherein capturing or measuring wavefront phase of the light emitted by the display in response to the at least one test signal comprises computing the propagation of the light emitted by the display in response to the at least one test signal to at least one phase screen and/or to the at least one acquisition system according to at least one of the following diffraction approximations: Fresnel diffraction approximation, Fraunhofer diffraction approximation, Rayleigh-Sommerfeld diffraction approximation.

5. The method according to claim 3, wherein the measured intensity distribution of the light emitted by the display in response to the at least test signal and/or the captured wavefront phase of the light emitted by the display in response to the at least one test signal is/are stored as image/s on a computer readable storage medium or storage device.

6. The method according to claim 1, further comprising a display stage, wherein displaying an input signal to be outputted on the display comprises displaying the input signal taking into account the captured display output information.

7. The method according to claim 6, wherein the display stage further comprises propagating the wave-front phase of the input signal to a predetermined optical plane based on the captured wave-front phase information.

8. A non-transitory computer-readable medium carrying instructions which when executed by a computer, cause the computer to carry out a method for characterizing a display, according to claim 1.

9. A computer system comprising:
   at least one processor unit configured to carry out a method for characterizing a display, according to claim 1, wherein the at least one processor unit comprises a graphical processor unit (GPU) or a central processing unit (CPU); and
   a field programmable gate array, FPGA, and/or a complex programmable logic device, CPLD.

10. An optical system for characterizing a display, comprising:
    at least one acquisition system, wherein the at least one acquisition system is placeable at a predetermined distance from the display and comprises at least one direct wave-front sensor, and wherein the at least one direct wave-front sensor is a Shack-Hartmann sensor, and
    wherein the at least one acquisition system is configured for capturing an impulse response of the display in response to at least one test signal applied to the display, wherein said test signal comprises a series of signals with a predetermined time interval of at least 0.05 ms between consecutive signals, and wherein the at least one acquisition system is configured for capturing the wavefront phase of the light emitted by the display in response to the at least one test signal applied to the display.

11. The optical system according to claim 10, wherein the at least one acquisition system comprises at least one camera, and wherein the at least one camera comprises a camera for capturing light intensity of incoming light and/or a light-field camera or a plenoptic camera for capturing both the intensity and direction of incoming light.

12. The method according to claim 1, wherein the display is a light-field display or a display with or without a phase screen.

13. The optical system according to claim 10, wherein the at least one acquisition system further comprises an indirect wave-front sensor.

14. The method according to claim 3, wherein each signal of the series of signals is provided as input before the display image is characterized.

15. The method according to claim 3, wherein the at least one acquisition system captures the impulse response of each signal of the series of signals before the display image is characterized.

16. The method according to claim 1, wherein each signal of the series of signals is applied to one pixel or a group of pixels.

17. The method according to claim 1, wherein capturing the impulse response comprises measuring the at least one acquisition system received intensity distribution of the light emitted by the display in response to the at least one test signal.

18. The optical system according to claim 10, wherein the at least one acquisition system is configured for measuring the at least one acquisition system received intensity distribution of the light emitted by the display in response to the at least one test signal.

* * * * *